United States Patent [19]
Saito et al.

[11] Patent Number: 5,633,062
[45] Date of Patent: May 27, 1997

[54] METHOD OF MANUFACTURING ROTATION SENSOR AND STRUCTURE OF ROTATION SENSOR

[75] Inventors: Hidetoshi Saito; Masahiro Kume, both of Hyogo, Japan

[73] Assignee: Sumitomo Electric Industries, Ltd., Osaka, Japan

[21] Appl. No.: 287,196

[22] Filed: Aug. 8, 1994

[30] Foreign Application Priority Data

Sep. 1, 1993 [JP] Japan .................. 5-217648

[51] Int. Cl.$^6$ .................................. G01P 3/42
[52] U.S. Cl. .............. 428/68; 73/519.01; 324/167; 324/173; 324/174; 324/200; 384/174; 384/448; 428/75; 428/76; 428/213
[58] Field of Search ................ 428/68, 75, 76, 428/213; 324/167, 173, 208, 174; 73/519; 384/448, 174

[56] References Cited

U.S. PATENT DOCUMENTS

| | | | |
|---|---|---|---|
| 4,804,911 | 2/1989 | Saito | 324/167 |
| 5,032,790 | 7/1991 | Johnson | 324/174 |
| 5,148,105 | 9/1992 | Okada | 324/207.14 |
| 5,388,916 | 2/1995 | Ohtsuki | 384/448 |

FOREIGN PATENT DOCUMENTS

| | | |
|---|---|---|
| 0480844 | 4/1992 | European Pat. Off. . |
| 2576245 | 7/1986 | France . |
| 61-181321 | 11/1986 | Japan . |
| 63-235811 | 9/1988 | Japan . |
| 5-30765 | 4/1993 | Japan . |

*Primary Examiner*—Nasser Ahmad
*Attorney, Agent, or Firm*—W. G. Fasse; W. F. Fasse

[57] ABSTRACT

A method of manufacturing a rotation sensor can effectively prevent a sensor element from moving during a resin molding process for forming a resin portion that covers the sensor element to provide excellent waterproofness and airtightness. During a first resin injection step, an end of a bobbin of the sensor element is fixed or held in place by a slide core. Thereafter the slide core is extracted and resin is again injected in a second injection step into a vacated portion that is formed by extraction of the slide core. In the finished rotation sensor, the resin completely surrounds and encloses the bobbin, except at an exposed end of a magnetic pole piece. A metal mounting bracket is embedded in the resin at a spacing away from the bobbin. The bobbin has a positioning cavity to receive the slide core during the molding. The resin covering an upper part of the bobbin is at least four times as thick as the resin covering the coil of the sensor element.

17 Claims, 7 Drawing Sheets

METHOD OF MANUFACTURING ROTATION SENSOR AND STRUCTURE OF ROTATION SENSOR

BACKGROUND OF THE INVENTION

1. Field of the Invention

The present invention relates to a method of manufacturing a rotation sensor and a structure of such a rotation sensor, and more particularly, it relates to a method of manufacturing a rotation sensor to be used for a wheel speed sensor for an automobile or the like and a structure of such a rotation sensor.

2. Description of the Background Art

In general, a wheel speed sensor is known as a sensor for detecting the wheel speed of an automobile or the like. High airtightness is required for such a wheel speed sensor, in consideration of the environment of its application. In general, therefore, an internal detecting portion (sensor element) of the wheel speed sensor is inserted in a case of stainless steel or the like, and an opening of this case is sealed with resin. This structure is disclosed in Japanese Patent Laying-Open No. 63-235811 (1988), for example. FIG. 10 is a sectional structural diagram showing the conventional wheel speed sensor disclosed in this Japanese Laying-Open Publication. Referring to FIG. 10, a sensor element, which is formed by a magnet 102, a coil 103, a magnetic pole piece 104, a bobbin 105 and the like is housed in a case 108 of stainless steel or the like in this conventional wheel speed sensor (rotation sensor). The interior of the case 108 is molded with resin by a first resin portion 109a to a portion close to an opening 112 of the case 108. Both ends of a thin wire that is wound on the coil 103 are soldered to lower portions 106a of terminals 106, while these lower portions 106a are covered with the first resin portion 109a.

A bracket 111 for fixing the rotation sensor is bonded to an outer side of the case 108 by brazing. Forward end portions 113 of an output wire 107 are joined by caulking to upper portions 106b of the terminals 106. A pipe-shaped output wire protecting member 110 is provided around a portion of the output wire 107 that is close to the forward end portions 113. The opening 112 of the case 108 and the upper portions 106b of the terminals 106 are covered with a second resin portion 109b. The second resin portion 109b is molded under a high temperature and a high pressure, so that the opening 112, the output wire protecting member 110 and the surface of the bracket 111 facing forward the output wire 107 are in close contact with the second resin portion 109b respectively.

In the conventional rotation sensor shown in FIG. 10, however, it is difficult to reduce the product cost since the case 108 is made of a high-priced metal such as stainless steel.

In general, therefore, there has been proposed a system of covering the entire sensor element with resin without employing the case 108 of stainless steel or the like. In such a system, however, the sensor element is disadvantageously moved or displaced by the pressure that is applied for molding the exterior of the sensor element with resin.

In order to prevent such a disadvantage, there has generally been proposed a method of exposing a part of a bobbin, which is one of components forming a sensor element to the exterior of a resin portion and fixing or holding the sensor element through the exposed part of the bobbin. This method is disclosed in Japanese Utility Model Laying-Open No. 61-181321 (1986), for example. FIG. 11 is a sectional structural diagram showing a rotation sensor which is disclosed in this Japanese Utility Model Laying-Open Publication. Referring to FIG. 11, the conventional rotation sensor is so structured that an end 214a of a bobbin 214 is exposed from a resin portion 220 entirely covering a sensor element. Due to this structure, it is possible to fix or hold the sensor element by the end 214a of the bobbin 214 during the molding of the resin portion 220. In the structure shown in FIG. 11, the sensor element is formed by a ferrite magnet 212, a spacer 213, a pole piece 211, the bobbin 214, and a coil 215.

In the conventional structure shown in FIG. 11, however, water permeates through a clearance between the end 214a of the bobbin 214 and the resin portion 220 in actual use, although the sensor element can be prevented from movement during the molding of the resin portion 220. As the result, insulation resistance in the interior is deteriorated, which reduces the performance. As to permeation of water through a clearance between the pole piece 211 and the resin portion 220, on the other hand, it is possible to readily improve waterproofness or water-tightness by inserting an O-ring around the pole piece 211 or the resin portion 220.

Further, a method of fixing or holding a sensor element by small pins during resin molding is also known in general, as another method of preventing the sensor element from movement during the resin molding. In this method, however, holes are formed in the resin portion where it receives the pins that are employed in the resin molding. Although the holes are filled up by resin potting or the like in a later step, water still permeates through the filled-up portions of the holes, to cause a problem which is similar to that in the structure shown in FIG. 11. Namely, insulation resistance in the interior is deteriorated, which reduces the performance by permeation of water into the interior of the resin portion (sensor element) Further, the operation for filling up the holes disadvantageously increase the number of steps.

SUMMARY OF THE INVENTION

An object of the present invention is to provide a method of manufacturing a rotation sensor and a structure of such a rotation sensor, which can effectively prevent permeation of water into a sensor element through formation of a resin portion for enclosing the periphery of the sensor element.

Another object of the present invention is to provide a rotation sensor that correctly positions a sensor element during formation of a resin portion for enclosing the periphery of the sensor element by resin molding.

A first aspect of the present invention provides a method of manufacturing a rotation sensor, which can include a sensor element having a magnet, a magnetic pole piece, a bobbin and a coil, and a resin portion enclosing the periphery of the sensor element. This method comprises a step of forming the sensor element a step of inserting the sensor element in a resin mold while bringing a bush belonging to the resin mold into contact with the bobbin, a first injection step of injecting resin into the resin mold through its injection port, a step of extracting the bush after the first injection step which defines a vacated portion in the resin where the bush has been removed and a second injection step of again injecting resin through the injection port of the resin mold thereby filling up the vacated portion with resin. The injection port of the mold may be provided around the bush. Further, the injection port of the mold may be so provided that the bush is positioned on its extension. Further, the bush may be extracted simultaneously with completion of the first injection step. Alternatively, the bush may be extracted after a lapse of a prescribed time after completion of the first injection step.

In this method of manufacturing a rotation sensor, the bush belonging to the resin mold is brought into contact with the bobbin forming the sensor element so that resin is injected into the resin mold in this state through the first injection step, and thereafter the bush is extracted so that resin is again injected into the vacated portion, which has been formed by extraction of the bush, through the second injection step. Namely, the bush is extracted after the resin that has been injected through the first injection step starts to solidify, and thereupon resin is further injected into the vacated portion, which has been formed by extraction of the bush, through the second injection step. In this manner the sensor element portion will not move during the resin molding, which is readily carried out to seal the sensor element. Consequently, the sensor element is effectively protected from permeation of water from the exterior of the resin portion covering the sensor element in actual employment. Furthermore, when the injection port of the mold is provided around the bush, solidification of the resin does not readily to progress around the bush after the first injection step and the bush can be extracted after the remaining portion of the resin starts to sufficiently solidify, whereby the sensor element is effectively prevented from movement after extraction of the bush. When the injection port of the mold is so formed that the bush is positioned on its extension, further, resin is so injected that it strikes the bush in a high temperature state immediately after injection in the first injection step. Thus, the temperature of the bush is so increased that solidification of the resin is further suppressed around the bush.

According to a second aspect of the present invention, a structure of a rotation sensor comprises a sensor element including a magnet, a magnetic pole piece, a bobbin and a coil, a resin portion formed to enclose the periphery of the sensor element portion excluding a forward end of the magnetic pole piece for sealing the same, and a metal support for supporting/fixing i.e. mounting sonsor element portion and the resin portion.

According to this structure of a rotation sensor, the metal support for mounting the sensor element and the resin portion is provided to be embedded in the resin portion at a prescribed space from the sensor element while resin forming the resin portion is filled up in the space between the metal support and the sensor element portion, whereby permeation of water from the exterior through the metal support portion into the sensor element is effectively prevented in actual employment, and high waterproofness as well as airtightness can be attained.

According to a third aspect of the present invention, a structure of a rotation sensor comprises a sensor element including a magnet, a magnetic pole piece, a bobbin, that is so formed as to house a part of the magnetic pole piece and the magnet therein, and a coil that is wound on an outer peripheral portion of the bobbin, and a resin portion that is formed to enclose the periphery of the sensor element excluding a forward end of the magnetic pole piece for sealing the same. The bobbin is provided with a cavity to serve as a positioning member during formation of the resin portion. The cavity may be formed on an upper surface of the bobbin. Further, the cavity may be formed on a side surface of the bobbin that is above or upward beyond the position receiving the coil.

According to this structure of a rotation sensor, the bobbin forming the sensor element is provided with the cavity that serves as a positioning member during formation of the resin portion, whereby it is possible to position the bobbin in a self-adjusting manner by inserting a bush into the cavity of the bobbin during resin molding. Thus, positioning accuracy for the sensor element is further improved. When the cavity is formed on the upper surface of the bobbin, a slide core may be provided only in a single portion and hence the structure of a mold is simplified. When the cavity is formed on a side surface part that is upward beyond the position of the bobbin receiving the coil, further, it is possible to readily move the slide core and a resin injection port in proximity to each other due to the structure of the mold. Thus, the resin is injected around the bush in a high temperature state immediately after injection when the resin is injected through the injection port, whereby the temperature of the bush is increased to suppress solidification of the resin around the same.

According to a fourth aspect of the present invention, a structure of a rotation sensor comprises a sensor element including a magnet, a magnetic pole piece, a bobbin that is so formed as to house a part of the magnetic pole piece and the magnet therein, and a coil that is wound on an outer peripheral portion of the bobbin, and a resin portion that is formed to enclose the periphery of the sensor element portion excluding a forward end of the magnetic pole piece for sealing the same.

In this structure of a rotation sensor, the resin portion that is formed to seal the sensor element is formed by a first resin portion, having a first thickness, covering a surface of the coil, and a second resin portion, having a second thickness of at least about four times the first thickness, covering an upper portion of the bobbin, whereby cooling and solidification by a mold is reduced in the second resin portion having a larger thickness. Thus, solidification of resin is retarded around a bush that is positioned in the second resin portion.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS AND OF THE BEST MODE OF THE INVENTION

Embodiments of the present invention are now described on the basis of the drawings.

Figure 1:
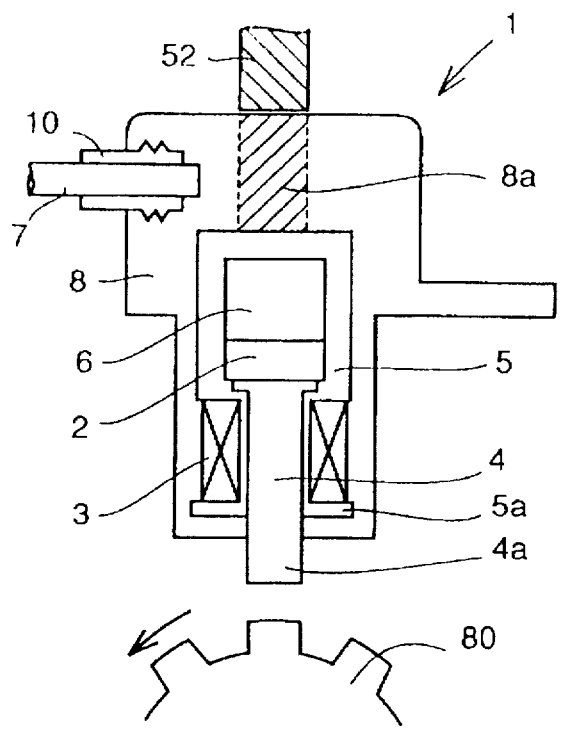
FIG. 1 is a sectional view showing a wheel speed sensor for illustrating a first embodiment of a method of manufacturing a wheel speed sensor according to the present invention.
Figure 2:
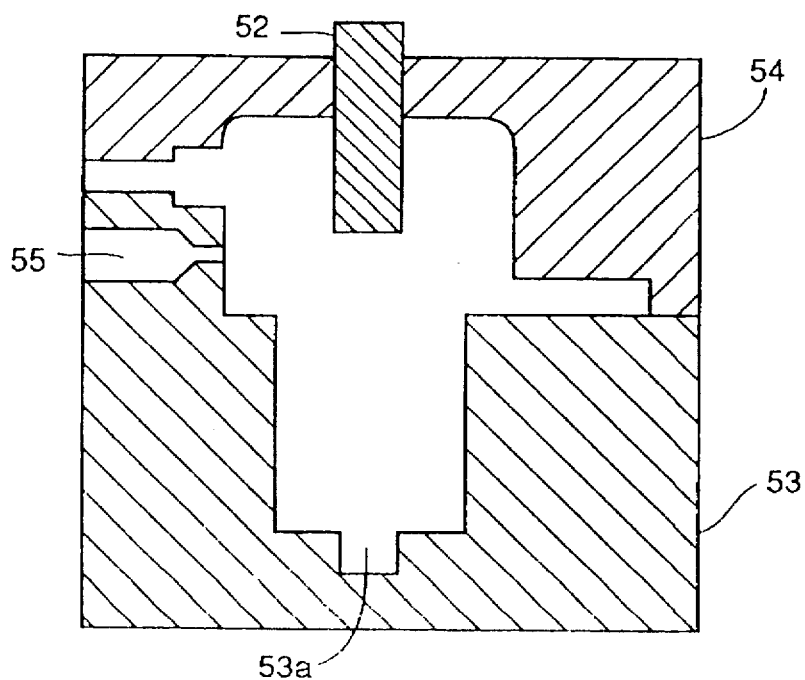
FIG. 2 is a sectional view showing a resin mold employed for manufacturing the wheel speed sensor shown in FIG. 1.

With reference to FIGS. 1 and 2, a first embodiment of a method of manufacturing a wheel speed sensor is described.

First, a bobbin 5 housing a magnet 2, a yoke 6 and a magnetic pole piece 4 therein and having terminals (not shown) embedded therein at prescribed locations is formed by resin molding. This bobbin 5 is prepared from polyphenylene sulfide (PPS) resin, for example.

Then, a coil 3 is wound on the bobbin 5. Both end portions (not shown) of the coil 3 are connected to the terminals (not shown). An upper end (not shown) of a cable 7, which is inserted in a cable protecting member 10, is connected to the aforementioned terminals.

Then, the bobbin 5, housing the magnet 2, the yoke 6 and the magnetic pole piece 4 therein and having the coil 3 wound on a part of its outer periphery, and the cable 7 are arranged in a lower mold section 53 and an upper mold section 54. At this time, a forward end portion 4a of the magnetic pole piece 4 is inserted in a cavity 53a of the lower mold section 53, thereby fixing the forward end side of the sensor element.

Then, a slide core or bush 52 belonging to the upper mold section 54 is inserted in the mold so that its forward end portion is in contact with a rear end surface of the bobbin 5, thereby fixing the rear end of the bobbin 5.

In this state, a resin such as nylon 66, for example, is injected through a gate injection port 55. The injected resin starts to solidify from a portion having a small thickness such as that around the outer periphery of the coil 3. Therefore, the progress of solidification is retarded in the vicinity of the rear end of the bobbin 5 around the slide core 52 where the resin has a large thickness, which is close to the gate 55 as compared with other portions.

When solidification of the resin progresses to such a degree that the bobbin 5 will not be displaced even if the same is not pressed by the slide core 52 while the resin is still in a molten state in the vicinity of the rear end of the bobbin 5, the slide core 52 is rearwardly extracted.

Due to such extraction of the slide core 52, resin newly flows into a vacated portion 8a, which is formed by the extraction of the slide core 52, through the gate 55. Thus, the vacated portion 8a is filled up with the resin, and a resin injection step is thereby completed.

After the resin entirely solidifies, resin molded wheel speed sensor 1 is taken out from the mold sections 53 and 54.

In the method of manufacturing a wheel speed sensor according to this embodiment, the resin injection step is divided into two stages as hereinabove described, whereby it is possible to readily mold a resin portion 8, having high waterproofness, covering the sensor element while effectively preventing the sensor element from movement during the resin molding.

Namely, resin is injected into the mold while the bobbin 5 is fixed or held by the slide core 52 in the first injection step. Then, the slide core 52 is extracted in a state in which the injected resin has solidified sufficiently to hold the bobbin 5 and to prevent the bobbin 5 from movement while the resin is still in a molten state in the vicinity of the slide core 52. Then, molten resin is introduced into the vacated portion 8a which is formed by extraction of the slide core 52 in a second injection step. The resin introduced into the vacated portion 8a is integrated with that remaining around this portion still in a molten state, followed by gradual progress of solidification. Thus, it is possible to ensure airtightness after solidification of the resin with no boundary defined between the resin injected in the second injection step and the resin injected in the first injection step. Consequently, it is possible to form the resin portion 8 with high waterproofness. Further, the bobbin 5 is fixed by the slide core 52 or the resin injected in the first injection step, and hence the bobbin will not move during resin molding, unlike the prior art. The wheel speed sensor 1 shown in FIG. 1 is completed by such a manufacturing method.

While water permeating through a clearance between the magnetic pole piece 4 and the resin portion 8 is inhibited from further permeation at a portion where a flange 5a provided on the forward end of the bobbin 5 engages with the resin portion 8, it is further effective to previously coat the flange 5a with a sealing agent of polyamide or the like, whereafter the resin portion 8 is molded, in order to further improve the waterproofness.

The function of the wheel speed sensor 1 is now described with reference to FIG. 1. In actual employment, the wheel speed sensor 1 is mounted in the vicinity of a sensor rotor 80 that is rotated with a tire of an automobile. Magnetic flux generated from the magnet 2 provided in the wheel speed sensor 1 passes through the magnetic pole piece 4, to reach the sensor rotor 80. When the sensor rotor 80 is rotated following rotation of the tire, the magnetic flux passing through the magnetic pole piece 4 is modulated in response to the irregular, e.g. notched or toothed, shape of the sensor rotor 80. An output voltage is generated in the coil 3 in proportion to the time change of such modulation. This output voltage is taken out to the exterior through the cable 7. Then, an external arithmetic unit (not shown) calculates the rotation speed from the frequency of the output voltage.

Figure 3:
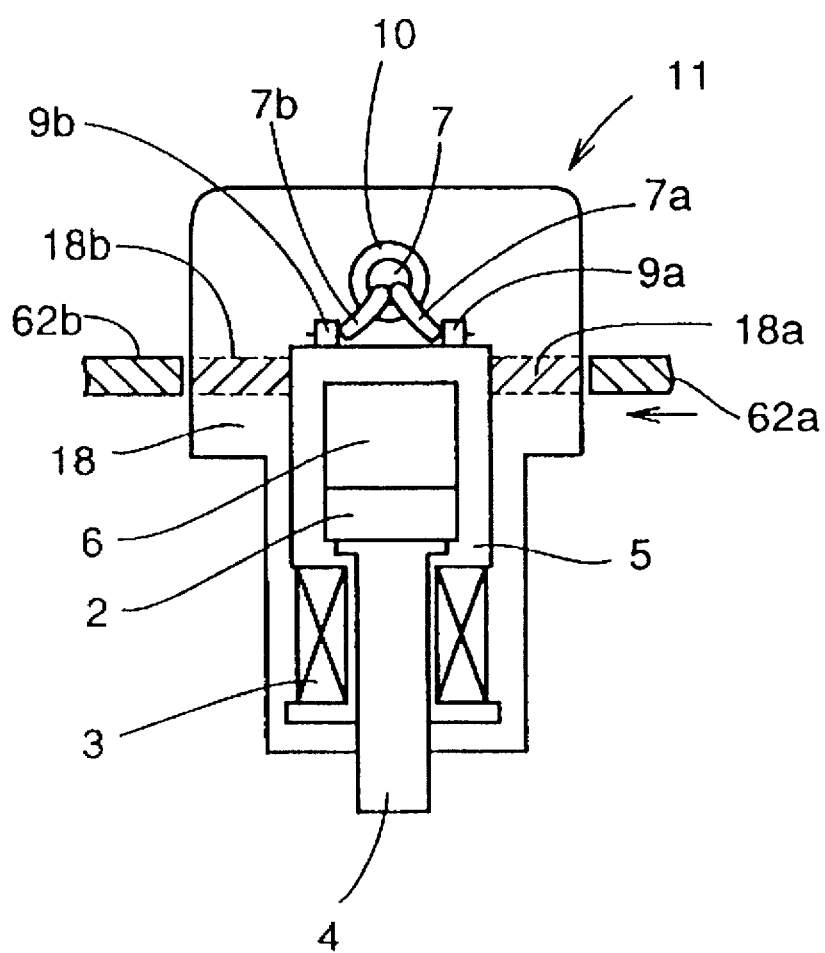
FIG. 3 is a sectional view showing a wheel speed sensor for illustrating a second embodiment of the method of manufacturing a wheel speed sensor according to the present invention.

Referring to FIG. 3, a wheel speed sensor 11 according to a second embodiment of the inventive method has an appearance similar to that of the wheel speed sensor 1 according to the first embodiment shown in FIG. 1. For convenience of illustration, FIG. 3 shows a structure taken along a section at 90° relative to the section shown in FIG. 1.

In the method according to the second embodiment, a bobbin 5 is transversely fixed by slide cores 62a and 62b during resin molding, dissimilarly to the first embodiment. The slide cores 62a and 62b are extracted after a first injection step, and resin is again injected into vacated portions 18a and 18b that are formed by extraction of the slide cores 62a and 62b. Thus, it is possible to form a resin portion 18 having high waterproofness while effectively preventing the bobbin 5 from movement during resin molding, similarly to the first embodiment. Terminals 9a and 9b provided on an upper portion of the bobbin 5 and end portions 7a and 7b of a cable 7 appear on the section shown in FIG. 3, dissimilarly to the section shown in FIG. 1.

Figure 4:
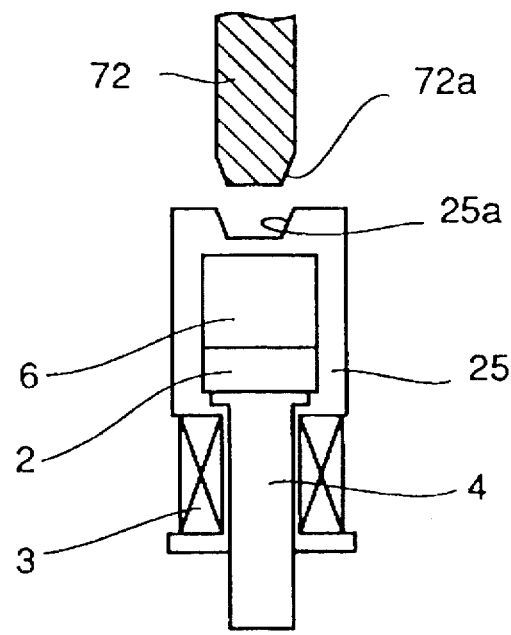
FIG. 4 is a sectional view showing a sensor element for illustrating a first embodiment of a structure of a wheel speed sensor according to the present invention.
Figure 5:
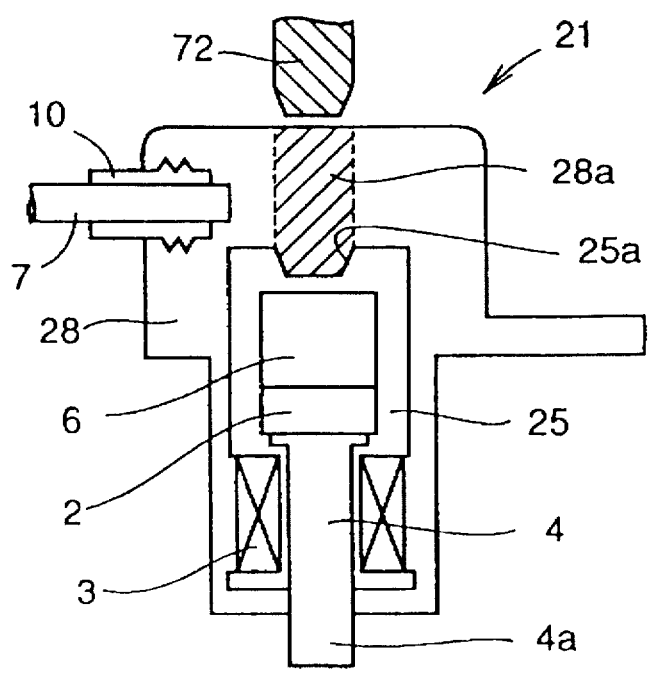
FIG. 5 is a sectional view showing a wheel speed sensor including the sensor element shown in FIG. 4.

Referring to FIGS. 4 and 5, a truncated-conical cavity 25a is formed in a rear end surface of a bobbin 25 of a sensor element in a wheel speed sensor 21 according to a first embodiment of the inventive structure of a wheel speed sensor. Thus, it is possible to readily position the bobbin 25 during formation of a resin portion 28 covering the bobbin 25.

In the structure of the first embodiment, the truncated-conical cavity 25a is formed in the bobbin 25, while a forward end 72a of a slide core 72 is formed to have the same inclination as the cavity 25a. When the slide core 72 is inserted in a mold to position the bobbin 25, therefore, it is possible to automatically carry out a positioning adjustment even if the slide core 72 is slightly misaligned with the bobbin 25. Consequently, it is possible to further correctly position the bobbin 25 during formation of the resin portion 28 covering the bobbin 25. Further, the mold is simplified in structure since the slide core 72 may be provided on a single portion. In a second injection step, resin is injected into a vacated portion 28a that is formed by extraction of the slide core 72 after a first injection step. Thus, it is possible to readily form the resin portion 28, which is excellent in airtightness and waterproofness, covering the bobbin 25 having the cavity 25a.

Figure 6:
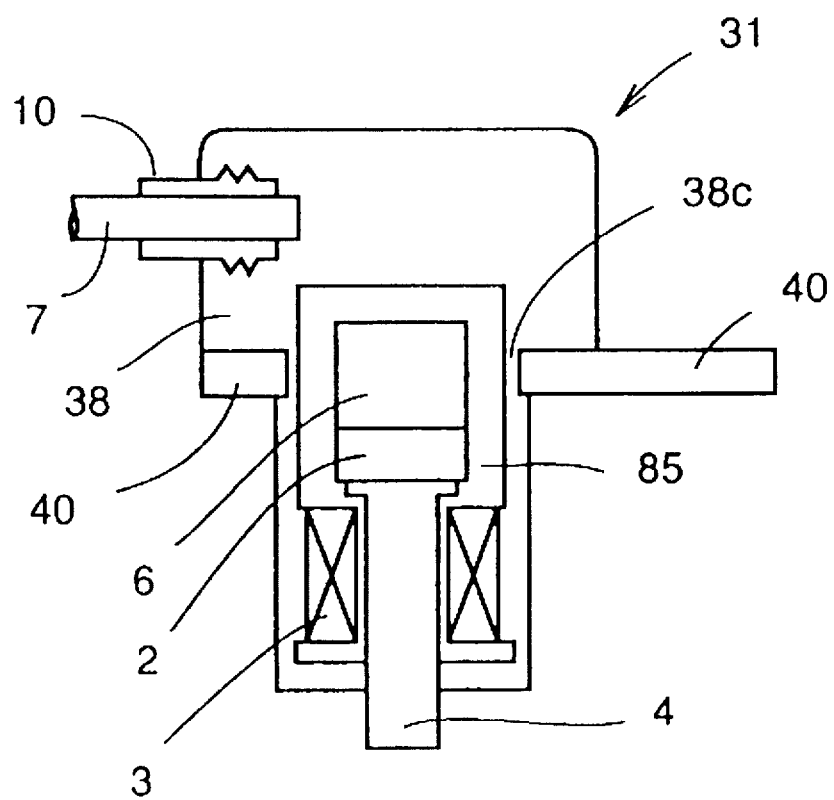
FIG. 6 is a sectional view showing a wheel speed sensor according to a second embodiment of the present invention.

Referring to FIG. 6, a wheel speed sensor 31 according to a second embodiment of the inventive structure of a wheel speed sensor has a sensor mounting bracket 40 of a metal such as stainless steel, for strongly fixing, i.e. rigidly mounting, the wheel speed sensor 31 in the vicinity of an object to be detected. The sensor mounting bracket 40 is integrated into a resin portion 38 by insertion molding. The wheel speed sensor 31 according to the second embodiment is so structured that a clearance is defined between the sensor mounting bracket 40 and a bobbin 85 when the metal sensor mounting bracket 40 is integrated into the resin portion 38. This clearance is filled up with resin 38c along the entire periphery. Due to such a structure, it is possible to effectively prevent water permeating through the sensor mounting bracket 40 from reaching the bobbin 85. Consequently, it is possible to ensure airtightness of a sensor element, i.e. the internal structure part thereof.

Figure 7:
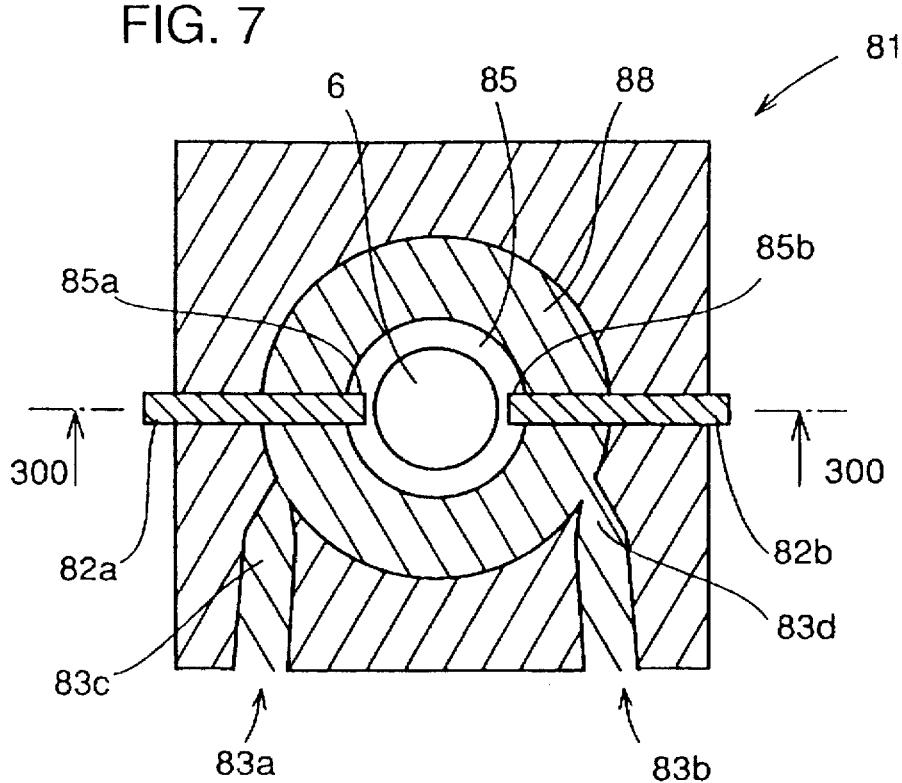
FIG. 7 is a cross-sectional view showing a mold and a molding employed for manufacturing the wheel speed sensor shown in FIG. 6.
Figure 8:
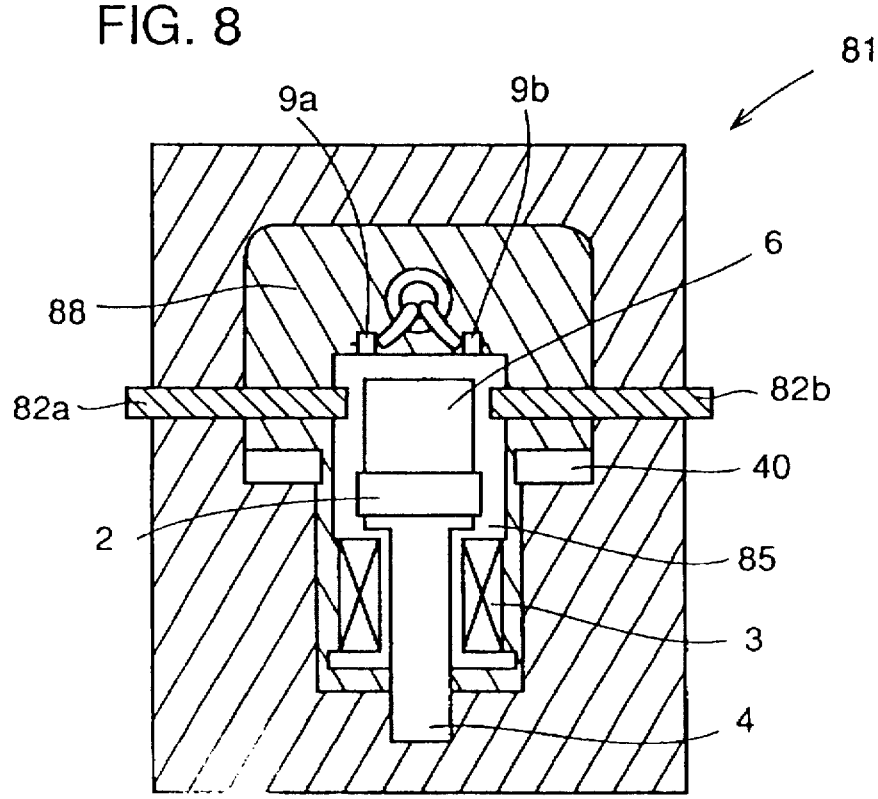
FIG. 8 is a longitudinal sectional view of the mold and the molding appearing in FIG. 7, taken along the line 300—300 in FIG. 7.

With reference to FIGS. 7 and 8, a method of manufacturing the wheel speed sensor 31 shown in FIG. 6 is now described. FIG. 8 shows a section of the wheel speed sensor 31 appearing in FIG. 6, which is rotated about a magnetic pole piece 4 by 90°.

First, a mold 81 employed in this method is so structured that slide cores 82a and 82b are horizontally movable along this mold 81. Gates 83a and 83b are provided to be flush with the slide cores 82a and 82b. Namely, mouths 83c and 83d of the gates 83a and 83b are directed to the slide cores 82a and 82b respectively. The wheel speed sensor 31 shown in FIG. 6 is manufactured through the mold 81 having such a structure.

Figure 9:
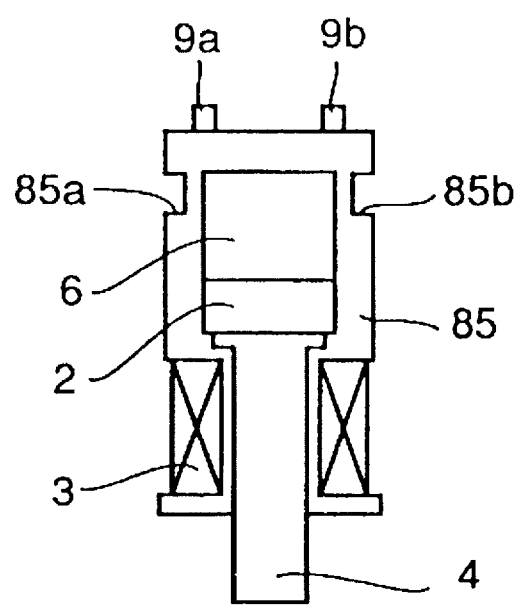
FIG. 9 is a partial sectional view illustrating a bobbin 85 shown in FIGS. 7 and 8.
Figure 10:
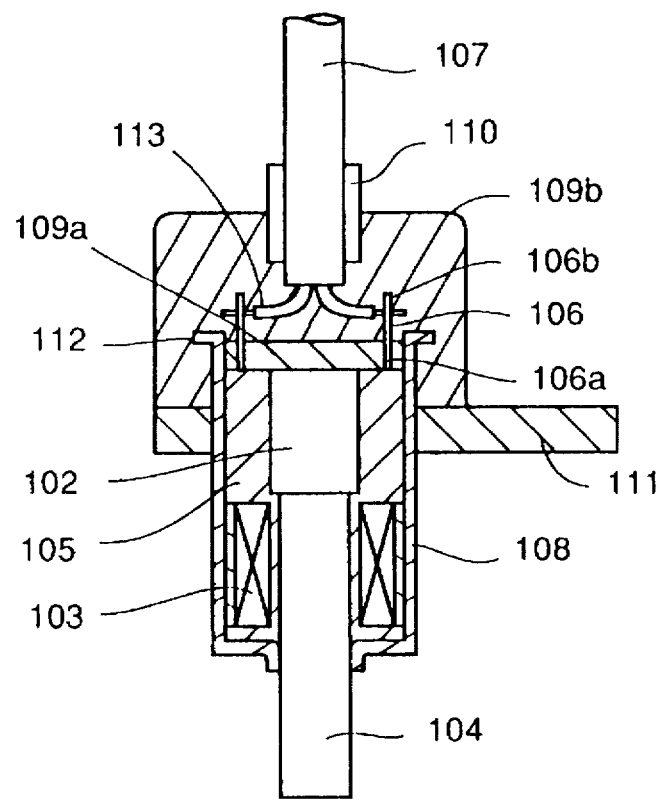
FIG. 10 is a sectional view showing a conventional wheel speed sensor.
Figure 11:
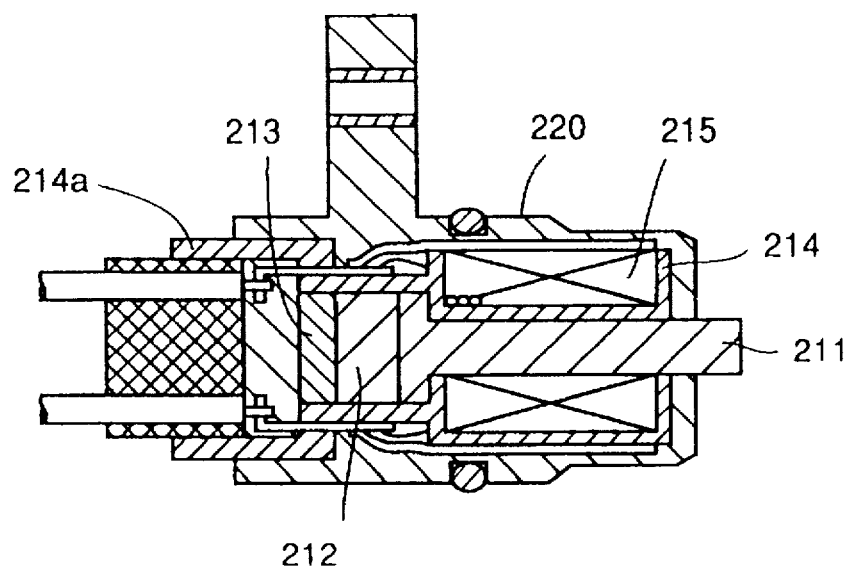
FIG. 11 is a sectional view showing a conventional improved wheel speed sensor.

In more concrete terms, the bobbin 85 housing a magnet 2, a yoke 6 and a magnetic pole piece 4 therein and having terminals 9a and 9b embedded in prescribed portions thereof is formed by resin molding. This bobbin 85 is prepared from a PPS resin, for example. Cavities 85a and 85b are provided in both upper side surfaces of the bobbin 85 to serve as positioning members when the bobbin 85 is supported by the slide cores 82a and 82b. FIG. 9 is a sectional view showing the bobbin 85 that is used in such resin molding. A coil 3 is wound on the bobbin 85, and both ends of the coil 3 are connected to the terminals 9a and 9b. Thereafter ends of a cable, which is inserted in a cable protecting member (not shown), are connected to the terminals 9a and 9b.

Then, the bobbin 85 that is formed in the aforementioned manner and the cable (not shown) are arranged in the mold 81 shown in FIGS. 7 and 8. Thereafter the slide cores or bushes 82a and 82b belonging to the mold 81 are inserted in the mold 81, so that forward ends of the slide cores 82a and 82b are brought into contact with the cavities 85a and 85b of the bobbin 85. Thus, the bobbin 85 is fixed or held in position.

In this state, resin 88 such as nylon 66, for example, is injected into the mold 81 through the gates or injection ports 83a and 83b. The resin 88 as injected first strikes the slide cores 82a and 82b, and is thereafter diffused around the same. Thus, the resin 88 strikes the slide cores 82a and 82b in a high temperature state immediately after injection, thereby increasing the temperature of the slide cores 82a and 82b. Consequently, cooling and hardening of the resin 88 is suppressed around the slide cores 82a and 82b.

The resin 88 flows at the maximum rate around the gates 83a and 83b, which also helps suppress hardening of the resin 88 around the slide cores 82a and 82b. Further, parts of the resin 88 around the positions of the slide cores 82a and 82b are larger in thickness by about five times than a part of the resin 88 covering the coil 3, whereby the thermal capacity is increased in the positions of the slide cores 82a and 82b. Consequently, hardening of the resin 88 is retarded also for this reason in these parts near the slide cores. Namely, the resin 88 starts to harden from relatively thin parts such as the part covering the coil 3 and the part between the bobbin 85 and the metal bracket 40 in this embodiment. In more concrete terms, the resin 88 is completely filled up after a lapse of three seconds from starting of injection, and starts to harden from the relatively thin parts after a lapse of six seconds.

After the relatively thin parts of the resin 88 start to harden, the slide cores 82a and 82b are extracted while the resin 88 flowing around the same is still in an unhardened state. In more concrete terms, the slide cores 82a and 82b are extracted after a lapse of three seconds from completion of resin injection.

Thereafter the resin 88 is continuously injected into vacated portions that are formed by extraction of the slide cores 82a and 82b. Thus, it is possible to form a protective resin portion that is integrally joined with the resin injected in the initial stage.

While the slide cores 82a and 82b are extracted after a lapse of three seconds from filling of the resin in this embodiment, the present invention is not restricted in this regard. Rather resin may already start to harden in a stage of completion of resin injection depending on the shape of the wheel speed sensor. In this case, the slide cores 82a and 82b may be extracted simultaneously with completion of resin injection with no problem.

While the time for extracting the slide cores 82a and 82b is decided on the basis of the time starting the resin injection in this embodiment, the present invention is not restricted in this regard. Instead, the time for extracting the slide cores 82a and 82b can alternatively be decided on the basis of a stage when movement of a cylinder for injecting the resin is stopped or a stage when a pressure, such as a pneumatic pressure, for example, that is employed for injecting the resin is increased in excess of a constant level.

According to the method of manufacturing a rotation sensor in the first aspect of the present invention, the resin is injected into the resin mold through its injection port in the first injection step while the bush belonging to the resin mold is brought into contact with the bobbin. Thereafter the bush is extracted and then resin is again injected into the vacated portion that is formed by extraction of the bush, in the second injection step. Thereby it is possible to readily manufacture a rotation sensor that is excellent in airtightness and waterproofness while effectively preventing the sensor element from movement during resin molding. Further, solidification of the resin injected in the first injection step is retarded in the vicinity of the bush as compared with other parts when the injection port of the resin mold is provided in the vicinity of the bush, whereby it is possible to readily extract the bush while the sensor element is sufficiently fixed or held in position by the precedingly solidifying parts of the resin. Consequently, it is possible to effectively prevent the sensor element from movement during resin molding dissimilarly to the prior art. When the injection port of the mold is so formed that the bush is positioned on its extension, the resin strikes the bush in a state of a high temperature immediately after injection, to increase the temperature of the bush. Thus, hardening of the injected resin is further retarded in the vicinity of the bush as compared with other parts, whereby the bush can be readily extracted after hardening of the other parts of the resin.

According to the structure of a rotation sensor in the second aspect of the present invention, the metal support portion for supporting and fixing, i.e. mounting, the sensor element and the resin portion is embedded in the resin portion at a prescribed space or clearance from the sensor element. This clearance between the metal support and the sensor element is filled up with the resin forming the resin portion to ensure waterproofness of the sensor element, whereby water permeating through the metal support will not reach the sensor element.

According to the structure of a rotation sensor in the third aspect of the present invention, the cavity serving as a positioning member during formation of the resin portion for the bobbin forming of the sensor element is so provided that it is possible to automatically adjust the sensor element into at a correct position by the bush even if the sensor element is slightly displaced. Consequently, it is possible to further correctly position the sensor during formation of the resin portion covering the sensor element. When the cavity is formed in the upper surface of the bobbin, the slide core can be provided only in one location, whereby the mold structure can be simplified. When the cavity is formed on the upper side surface of the bobbin, further, it is possible to arrange the slide core proximately to the resin injection port on the structure of the mold. Thus, it is possible to further suppress hardening of the resin around the slide core.

According to the structure of a rotation sensor in the fourth aspect of the present invention, the resin portion is formed by the first resin portion, having the first thickness, covering at least the surface of the coil and the second resin portion, having the second thickness of at least about four times the first thickness, covering the upper portion of the bobbin. Thereby the thermal capacity is increased in the second resin portion having a larger thickness as compared with the first resin portion having a smaller thickness. Thus, hardening of the resin is retarded in the second resin portion as compared with the first resin portion. Consequently, resin hardening is retarded in the vicinity of the bush which is positioned in the second resin portion, whereby the bush can be readily extracted after the preceding hardening of other resin parts. Thus, it is possible to effectively prevent the sensor element from movement during the resin molding, unlike in the prior art.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A rotation sensor, comprising:
   a sensor element including a magnet, a magnetic pole piece extending from said magnet, a bobbin arranged to enclose said magnet, and a coil arranged around said magnetic pole piece;
   a resin portion enclosing and sealing the periphery of said sensor element excluding a forward end of said magnetic pole piece; and
   a metal mounting support provided to facilitate external mounting of said rotation sensor;
   wherein said metal mounting support is partly embedded in said resin portion at a spacing distance from said sensor element, with a clearance between said metal mounting support and said sensor element being filled with resin of said resin portion.

2. A rotation sensor, comprising:
   a sensor element including a magnet, a magnetic pole piece extending from said magnet, a bobbin housing at least a part of said magnetic pole piece and said magnet therein, and a coil arranged around an outer peripheral portion of said bobbin; and
   a resin portion enclosing and sealing the periphery of said sensor element excluding a forward end of said magnetic pole piece;
   wherein said bobbin has a cavity therein that serves as a positioning member during formation of said resin portion, and wherein said cavity is filled and covered by resin of said resin portion.

3. The rotation sensor in accordance with claim 2, wherein said cavity is provided on an end surface of said bobbin opposite said forward end of said magnetic pole piece.

4. The rotation sensor in accordance with claim 2, wherein said cavity is provided on a side surface of said bobbin at a location displaced from said coil and more distant from said forward end of said magnetic pole piece than is said coil.

5. A rotation sensor, comprising:
   a sensor element including a magnet, a magnetic pole piece extending from said magnet, a bobbin housing at least a part of said magnetic pole piece and said magnet therein, and a coil arranged around an outer peripheral portion of said bobbin; and
   a resin portion enclosing and sealing the periphery of said sensor element excluding a forward end of said magnetic pole piece;
   wherein said resin portion includes a first resin portion having a first thickness that covers at least a surface of said coil, and a second resin portion having a second thickness that covers an upper portion of said bobbin opposite said forward end of said magnetic pole piece, and wherein said second thickness is at least about four times said first thickness.

6. The rotation sensor in accordance with claim 5, further comprising a metal mounting support protruding from and partly embedded in said resin portion, with a clearance between said mounting support and said sensor element that is filled with resin of said resin portion.

7. The rotation sensor in accordance with claim 6, wherein said mounting support is arranged at a transition between said first resin portion having said first thickness and said second resin portion having said second thickness.

8. The rotation sensor in accordance with claim 7, wherein said bobbin has a cavity therein that serves as a positioning member during formation of said resin portion, and wherein said cavity is filled and covered by resin of said second resin portion.

9. The rotation sensor in accordance with claim 6, wherein said bobbin has a cavity therein that serves as a positioning member during formation of said resin portion, and wherein said cavity is filled and covered by resin of said second resin portion.

10. The rotation sensor in accordance with claim 5, wherein said bobbin has a cavity therein that serves as a positioning member during formation of said resin portion, and wherein said cavity is filled and covered by resin of said second resin portion.

11. The rotation sensor in accordance with claim 5, wherein said bobbin includes a flange at an end thereof near said forward end of said pole piece, and wherein said flange is coated with a polyamide sealing agent and covered by resin of said first resin portion.

12. The rotation sensor in accordance with claim 1, wherein said bobbin has a cavity therein that serves as a positioning member during formation of said resin portion, and wherein said cavity is filled and covered by resin of said resin portion.

13. The rotation sensor in accordance with claim 1, wherein said bobbin includes a flange at an end thereof near said forward end of said pole piece, and wherein said flange is coated with a polyamide sealing agent and covered by resin of said resin portion.

14. The rotation sensor in accordance with claim 2, wherein said cavity has a round shape in a plan view thereof.

15. The rotation sensor in accordance with claim 2, wherein said cavity has a three-dimensional shape of a truncated frustum of a cone.

16. The rotation sensor in accordance with claim 2, wherein said bobbin has two of said cavities located respectively opposite one another on two opposite side surfaces of said bobbin.

17. The rotation sensor in accordance with claim 2, wherein said bobbin encloses an upper end of said magnet opposite said forward end of said magnetic pole piece.

* * * * *

UNITED STATES PATENT AND TRADEMARK OFFICE
CERTIFICATE OF CORRECTION

PATENT NO. : 5,633,062
DATED : May 27, 1997
INVENTOR(S) : Saito et al.

It is certified that error appears in the above-indentified patent and that said Letters Patent is hereby corrected as shown below:

Col. 1, line 48, replace "forward" by --toward--.
Col. 2, line 55, after "element" insert --,--.
Col. 3, line 40, replace "sonsor" by --sensor--.
Col. 5, line 39, replace "gate injection" by --gate or injection--.

Signed and Sealed this

Twenty-sixth Day of August, 1997

Attest:

BRUCE LEHMAN

Attesting Officer

Commissioner of Patents and Trademarks